(12) United States Patent
Kawanishi

(10) Patent No.: US 11,831,837 B2
(45) Date of Patent: Nov. 28, 2023

(54) INFORMATION PROCESSING SYSTEM, INFORMATION PROCESSING APPARATUS, AND CONTROL METHOD FOR VIRTUAL NETWORK COMPUTING CONNECTION METHOD FOR A REMOTELY OPERATED APPARATUS

(71) Applicant: CANON KABUSHIKI KAISHA, Tokyo (JP)

(72) Inventor: Masaki Kawanishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/831,309

(22) Filed: Jun. 2, 2022

(65) Prior Publication Data
US 2022/0394152 A1 Dec. 8, 2022

(30) Foreign Application Priority Data
Jun. 4, 2021 (JP) ................. 2021-094251

(51) Int. Cl.
*H04N 1/00* (2006.01)
*H04N 1/327* (2006.01)
*H04L 45/76* (2022.01)
*H04N 1/32* (2006.01)

(52) U.S. Cl.
CPC ......... *H04N 1/32767* (2013.01); *H04L 45/76* (2022.05); *H04N 1/00204* (2013.01); *H04N 1/32662* (2013.01); *H04N 1/32786* (2013.01); *H04N 1/32789* (2013.01); *H04N 2201/0044* (2013.01); *H04N 2201/0075* (2013.01)

(58) Field of Classification Search
CPC .................................... H04N 1/00204
USPC ..................................... 358/1.15, 5
See application file for complete search history.

(56) References Cited

U.S. PATENT DOCUMENTS

| | | | |
|---|---|---|---|
| 2012/0102209 A1* | 4/2012 | Fok Ah Chuen ... | H04L 65/1069 709/228 |
| 2015/0036178 A1* | 2/2015 | Nakamura ............ | H04L 67/02 358/1.15 |
| 2016/0219095 A1 | 7/2016 | Richardson et al. | |
| 2018/0213019 A1* | 7/2018 | Morita ................ | G06F 16/9566 |

FOREIGN PATENT DOCUMENTS

| | | |
|---|---|---|
| EP | 3993378 A1 | 5/2022 |
| JP | 2017224114 A | 12/2017 |

* cited by examiner

*Primary Examiner* — Jacky X Zheng
(74) *Attorney, Agent, or Firm* — Canon U.S.A., Inc. IP Division

(57) ABSTRACT

An information processing apparatus operating as a virtual network computing (VNC) server includes a memory and at least one processor in communication with the memory, wherein the at least one processor of the information processing apparatus is configured to perform, in a case where a request for a VNC connection is received from a second VNC client in a state in which the information processing apparatus is connected with a first VNC client using VNC, first connection control to maintain the connection with the first VNC client and not to establish a VNC connection with the second VNC client, or second connection control to cut off the connection with the first VNC client and to establish the VNC connection with the second VNC client.

15 Claims, 11 Drawing Sheets

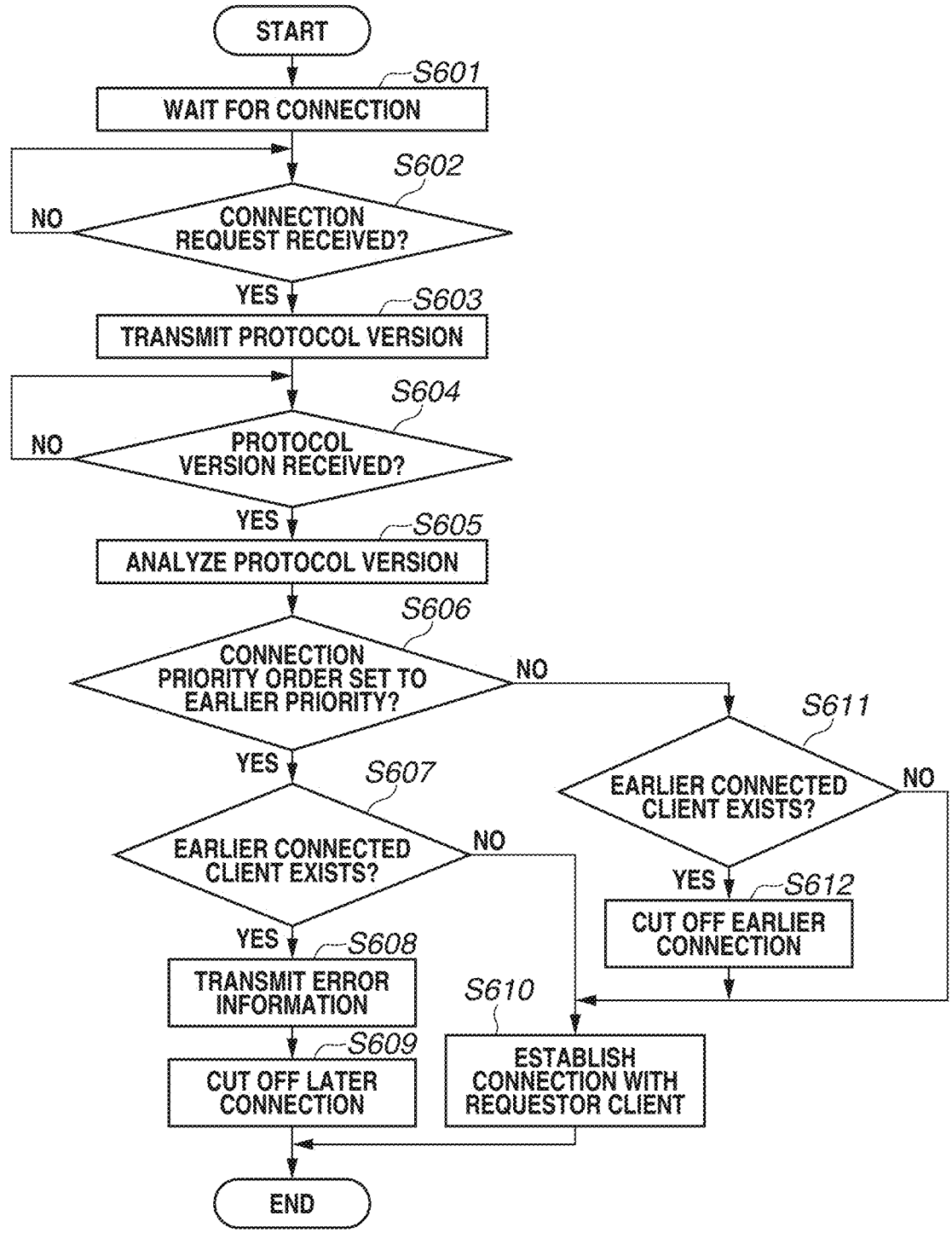

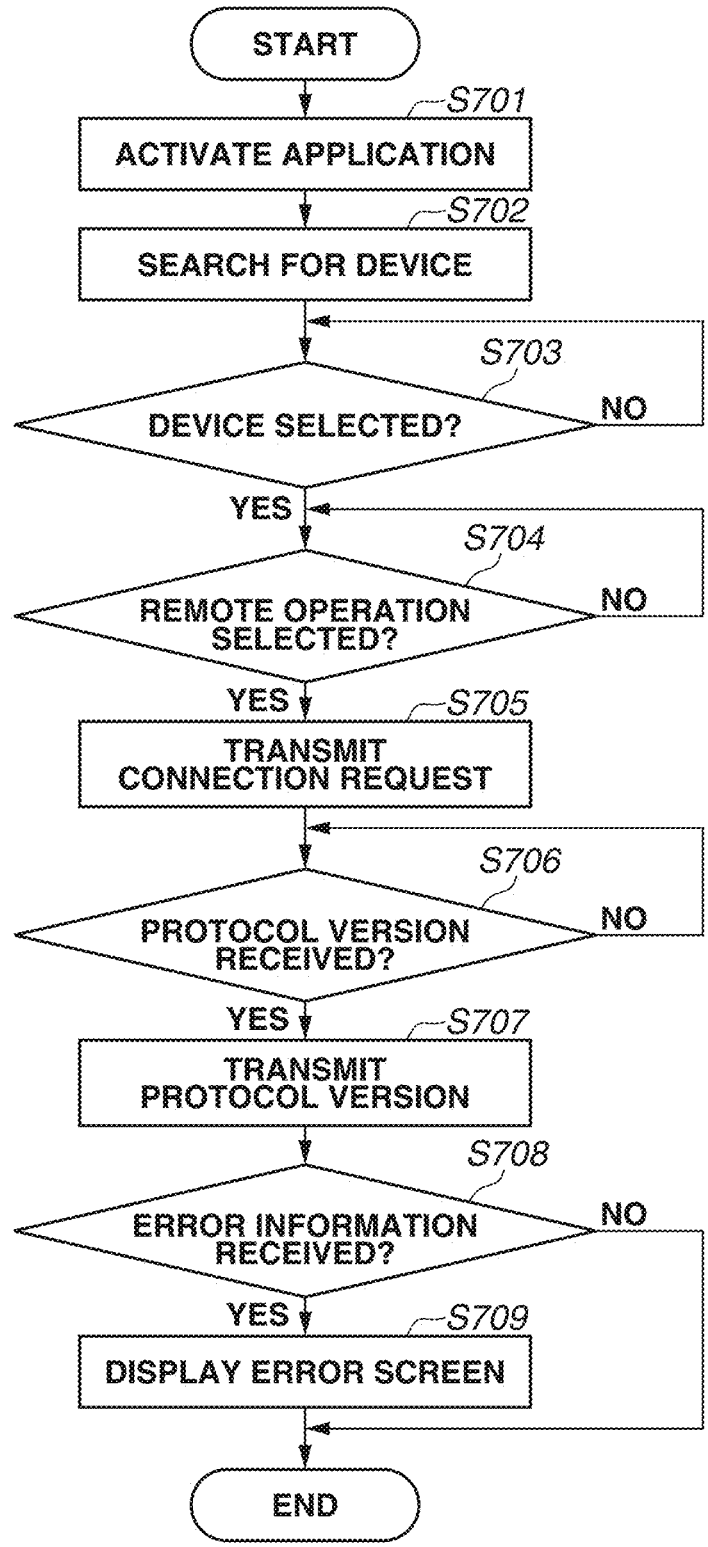

FIG.8A
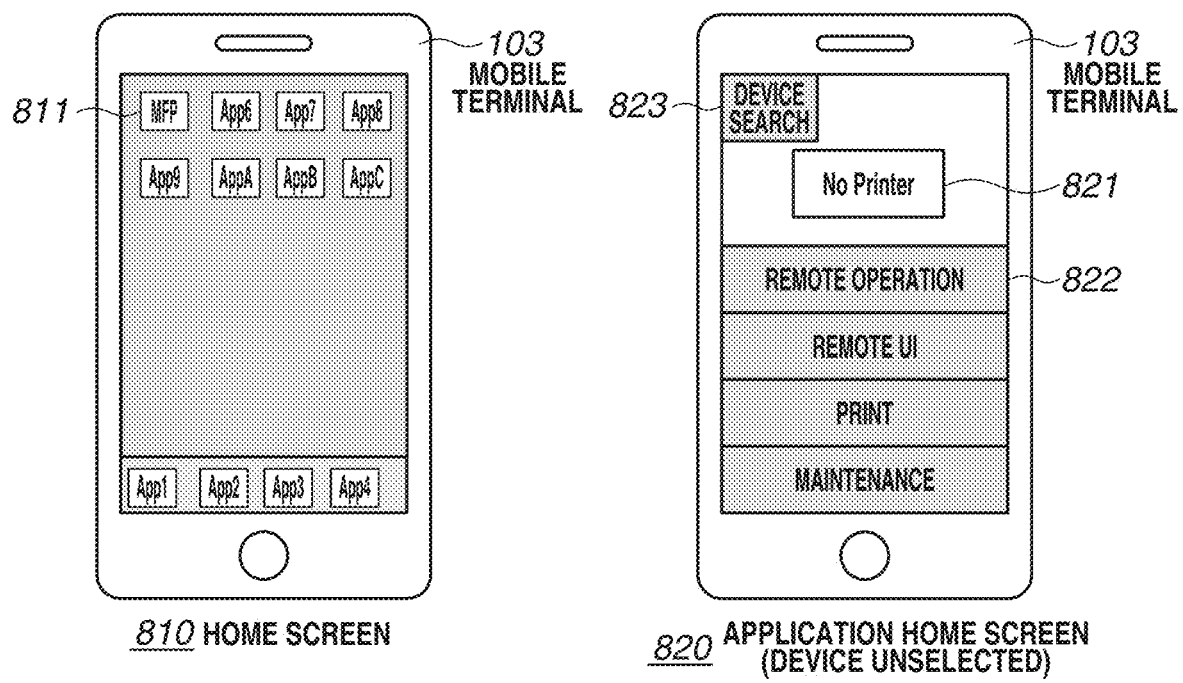
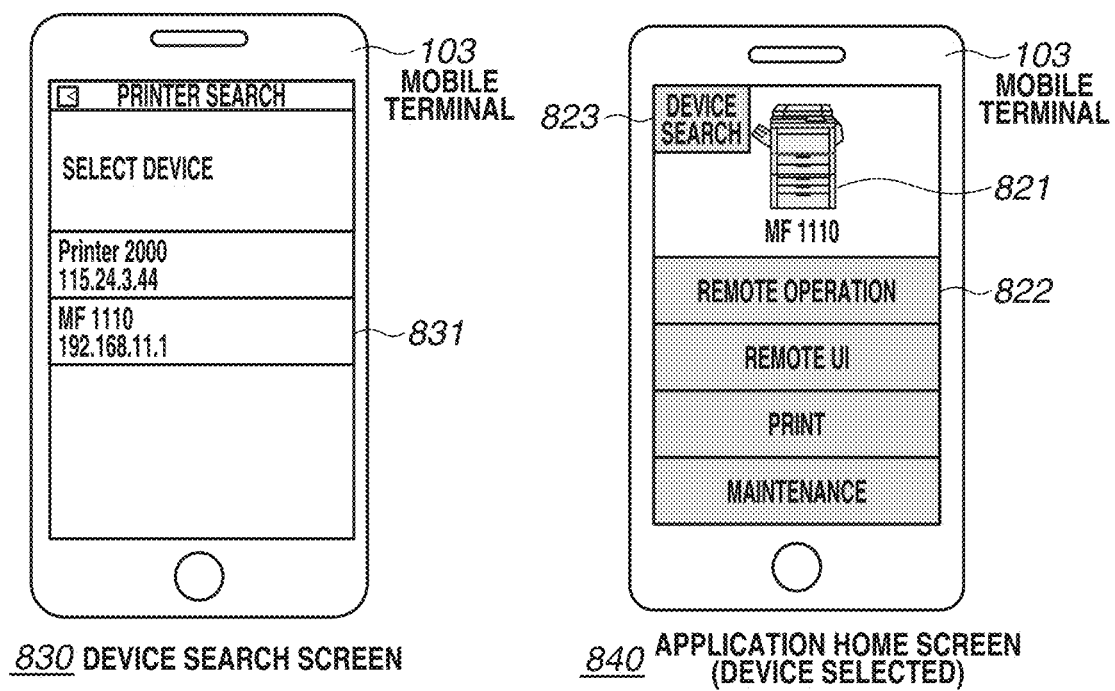

FIG.8B
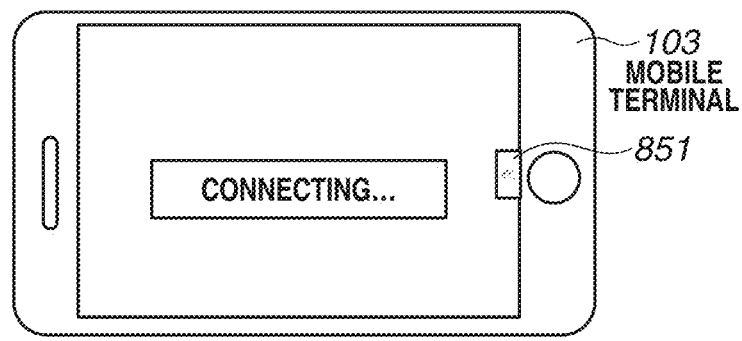
850 DEVICE CONNECTING SCREEN
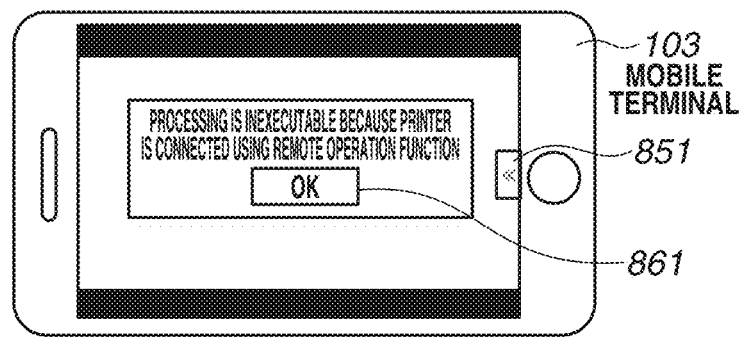
860 ERROR SCREEN
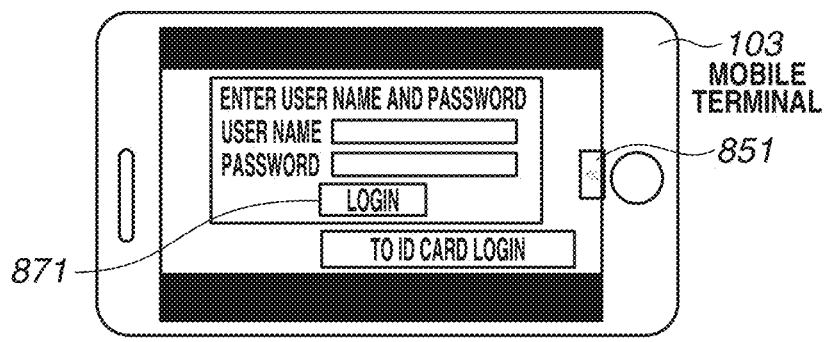
870 KEYBOARD LOGIN SCREEN

FIG.10
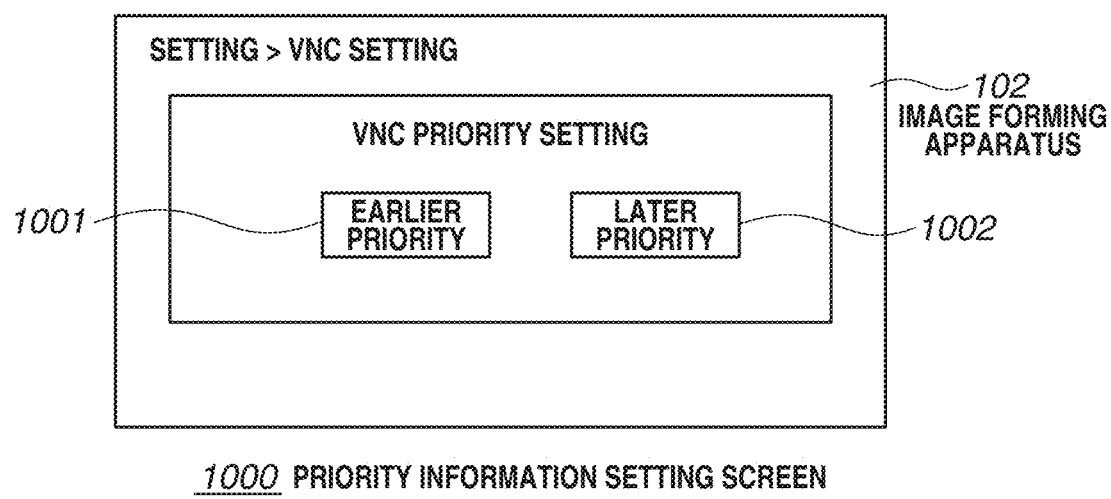
1000 PRIORITY INFORMATION SETTING SCREEN
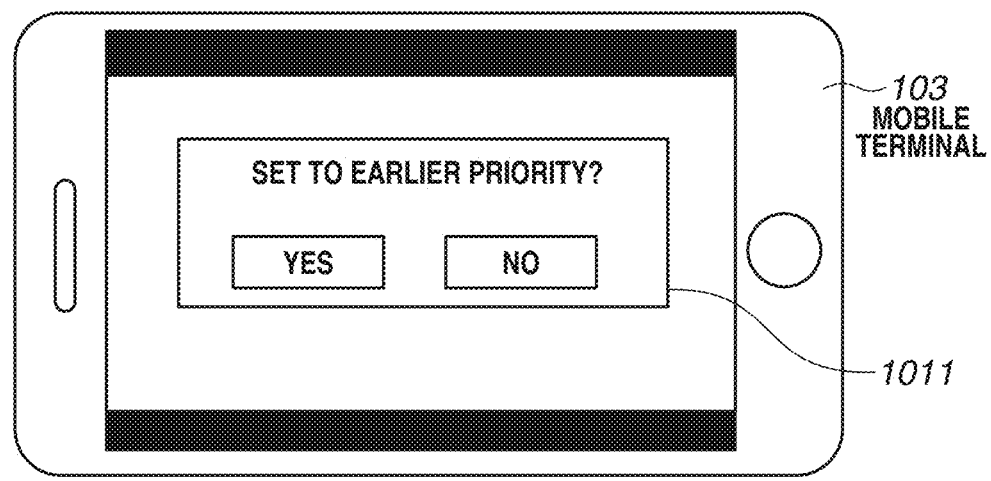
1010 PRIORITY INFORMATION DESIGNATION SCREEN

INFORMATION PROCESSING SYSTEM, INFORMATION PROCESSING APPARATUS, AND CONTROL METHOD FOR VIRTUAL NETWORK COMPUTING CONNECTION METHOD FOR A REMOTELY OPERATED APPARATUS

BACKGROUND OF THE INVENTION

Field of the Invention

The present invention relates to control executed in a case where an apparatus is remotely operated.

Description of the Related Art

There is a function of remotely operating an apparatus that is called "remote operation". The function is implemented using software called virtual network computing (VNC). While a server activates VNC server software, a client activates VNC client software, connects to the server, and performs a remote operation. Communication between the VNC server and the VNC client is executed using a remote frame buffer (RFB) protocol (RFC 6143). For example, an apparatus including a VNC server function transmits screen information about an operation screen to a terminal including a VNC client function. The terminal displays the same screen as an operation screen displayed on an operation panel of the apparatus, based on the received screen information. By performing an operation on the screen displayed on the terminal, a user can cause the apparatus to execute processing, without operating the operation panel of the apparatus.

In apparatuses such as image forming apparatuses in which a central processing unit (CPU) and memory resources are limited, the number of VNC clients that can be simultaneously connected and operated is limited to one in some cases. In this case, it is necessary to consider a connection priority order when a second VNC client is connected. Such an apparatus fixedly prioritizes a connection with a client connected earlier using the VNC ("earlier priority"), or fixedly prioritizes a connection with a client connected later using the VNC ("later priority"). In the case of the earlier priority, the connection with the client connected earlier using the VNC is maintained, and the connection with the client connected later using the VNC is not established. In the case of the later priority, the connection with the client connected earlier using the VNC is cut off, and the connection with the client connected later using the VNC is established.

Japanese Patent Application Laid-Open Publication No. 2017-224114 discusses a method of prioritizing a connection with a client connected later using the VNC and establishing a VNC connection in a case where the client satisfies a condition.

Nevertheless, if an apparatus serving as a VNC server fixedly operates based on the earlier priority or the later priority as in the prior art, usability declines. For example, in the case of the earlier priority, if a VNC connection with a client connected earlier using the VNC remains established even after a remote operation ends, a client to be connected later using the VNC cannot establish a VNC connection. Furthermore, in the case of the later priority, in a state in which a user has established a VNC connection with and has been performing a remote operation in front of the apparatus, if another user remotely establishes a VNC connection later, the established VNC connection is deprived by the later user even if the user exists in front of the apparatus.

In this manner, depending on a situation of a remote operation, the type of a client to be connected using the VNC, or the operation of an apparatus, while the earlier priority is desirable in some cases, the later priority is desirable in other cases.

SUMMARY OF THE INVENTION

The present invention is directed to providing a desirable virtual network computing (VNC) connection method in a case where the number of remotely-operable VNC clients is limited to one.

An information processing apparatus operating as a virtual network computing (VNC) server includes a memory and at least one processor in communication with the memory, wherein the at least one processor of the information processing apparatus is configured to perform, in a case where a request for a VNC connection is received from a second VNC client in a state in which the information processing apparatus is connected with a first VNC client using VNC, first connection control to maintain the connection with the first VNC client and not to establish a VNC connection with the second VNC client, or second connection control to cut off the connection with the first VNC client and to establish the VNC connection with the second VNC client.

Further features of the present invention will become apparent from the following description of embodiments with reference to the attached drawings.

BRIEF DESCRIPTION OF THE DRAWINGS

FIG. 6 is a flowchart illustrating connection processing performed by a virtual network computing (VNC) server.

FIG. 7 is a flowchart illustrating connection processing performed by a VNC client.

FIGS. 8A and 8B illustrate screens to be displayed on an operation panel of the mobile terminal.

FIG. 10 illustrates setting screens for setting a priority order of connections.

DESCRIPTION OF THE EMBODIMENTS

Hereinafter, embodiments for carrying out the present invention will be described with reference to the drawings. The following embodiments are not intended to limit the scope set forth in the appended claims, and not all the combinations of features described in the embodiments are always essential to the solution of the invention. In the following embodiments, the description will be given using an image forming apparatus as an example of an information processing apparatus, but the information processing apparatus is not limited to this.

Figure 1:
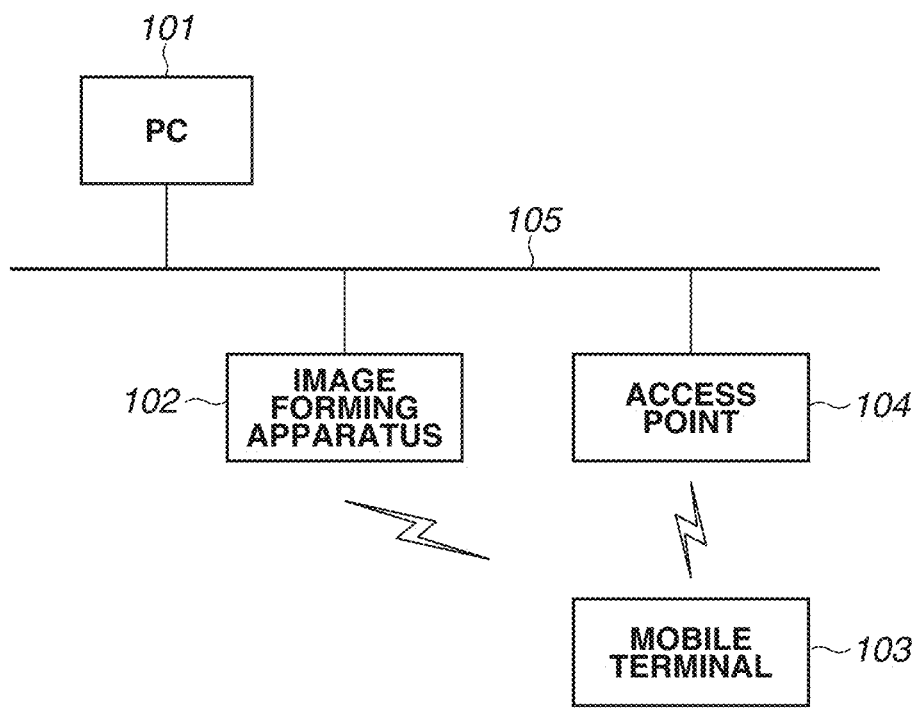
FIG. 1 is a diagram illustrating an example of a system configuration.

A first embodiment will be described. FIG. 1 is a diagram illustrating an example of a configuration of an information processing system. An image forming apparatus 102 including a virtual network computing (VNC) server function, a personal computer (PC) 101 serving as an information processing apparatus including a VNC client function, and an access point 104 are connected to a local area network (LAN) 105. A mobile terminal 103 serving as an information processing apparatus including a VNC client function is also connected to the LAN 105 via the access point 104. In a case where the image forming apparatus 102 and the mobile terminal 103 has a wireless direct communication function, the image forming apparatus 102 and the mobile terminal 103 can directly execute communication without the LAN 105. In the present embodiment, the description will be given of an example in which the mobile terminal 103 having the VNC client function connects using the VNC to the image forming apparatus 102 having the VNC server function. Nevertheless, a VNC client to be connected may be another apparatus (e.g., the PC 101 or another image forming apparatus that is not illustrated) as long as the apparatus includes a VNC client function.

Hereinafter, the image forming apparatus 102 operating as a VNC server will be referred to as a server, and an information processing apparatus such as the PC 101 or the mobile terminal 103 that connects using the VNC to the server will be referred to as a client.

The image forming apparatus 102 including the VNC server function transmits screen information corresponding to a screen displayed on a display unit of the image forming apparatus 102, to a client. The client that has acquired the screen information displays a screen corresponding to the screen displayed on the image forming apparatus 102. If an operation is performed on the screen displayed on the client, the operation information is transmitted to the image forming apparatus 102, and the image forming apparatus 102 performs processing in accordance with the operation. In other words, by establishing a VNC connection with the image forming apparatus 102, the client can remotely operate the image forming apparatus 102 (remote operation). The server according to the present embodiment limits the number of clients that can be simultaneously connected and operated, to one.

First of all, the image forming apparatus 102 activates VNC server software. Then, the image forming apparatus 102 waits for a connection request from the client. Next, the mobile terminal 103 activates VNC client software. Then, the mobile terminal 103 connects to a desired server by a user operation. Communication between the server and the client is executed in compliance with a remote frame buffer (RFB) protocol. The RFB protocol performs handshake processing first. Then, after the handshake processing is completed, transmission and reception of screen information and operation information are performed. In the present embodiment, at the time of execution of the handshake processing, the client transmits information for designating a connection priority order. The server determines a connection priority order in accordance with the received information. More specifically, in a case where the information designates that a connection with a client connected earlier using the VNC is prioritized (hereinafter, referred to as "earlier priority"), and in a case where another client has already been connected, a client to be connected later using the VNC cannot establish a VNC connection, or the later VNC connection is cut off. Moreover, in a case where the information designates that the connection with the client connected later using the VNC is prioritized (hereinafter, referred to as "later priority"), and in a case where another client has already been connected, the connection with the client connected earlier using the VNC is cut off. In this manner, the image forming apparatus 102 is configured to be operable both based on the earlier priority and the later priority.

Figure 2:
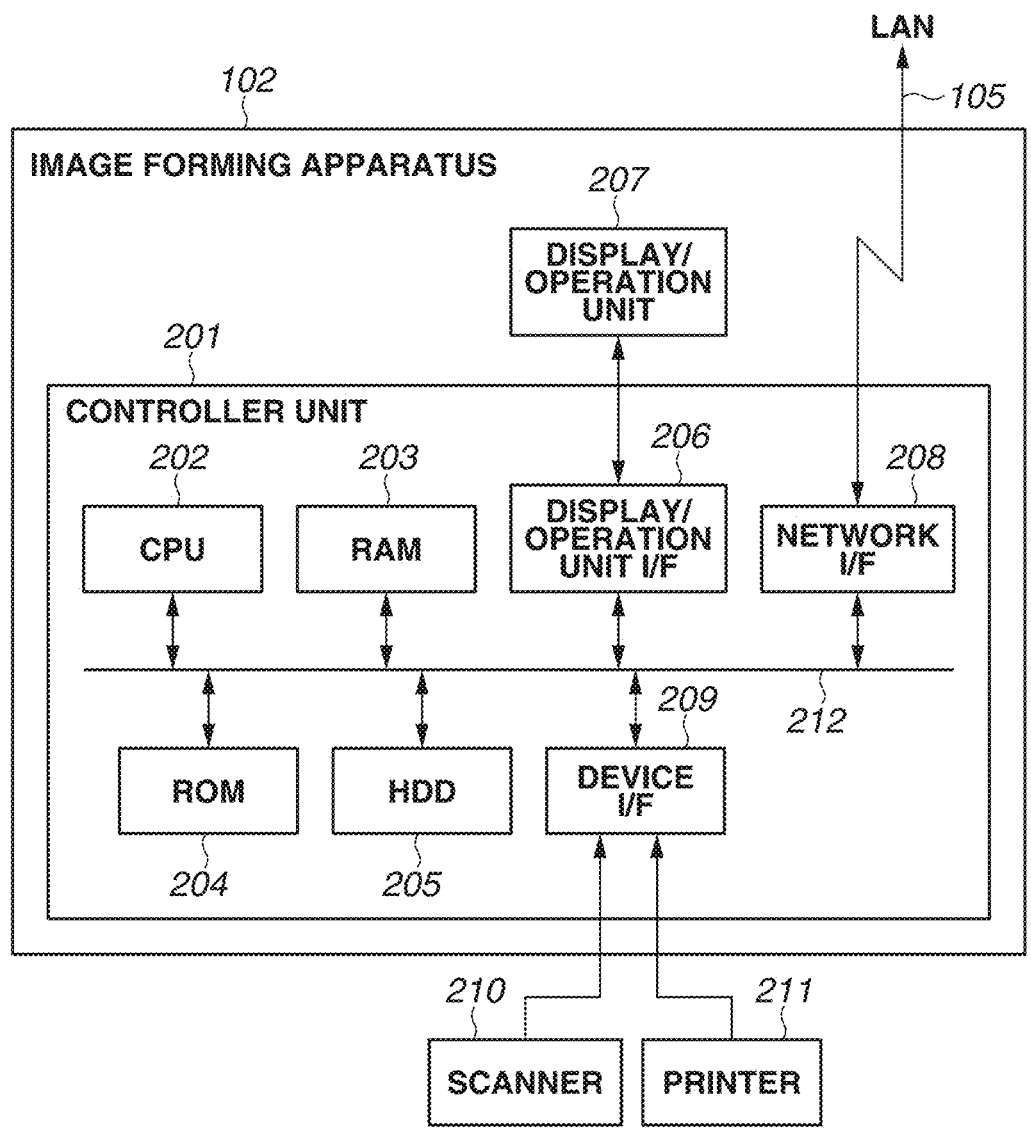
FIG. 2 is a diagram illustrating a hardware configuration of an image forming apparatus.

FIG. 2 is a diagram illustrating a hardware configuration of the image forming apparatus 102. In a controller unit 201 in the image forming apparatus 102, a central processing unit (CPU) 202 is an arithmetic device that controls the entire system. The CPU 202 comprehensively controls devices connected to a system bus 212.

A read-only memory (ROM) 204 is a nonvolatile memory, and stores image data and other types of data, and various programs based on which the CPU 202 operates.

A random access memory (RAM) 203 is a volatile memory, and is used as a temporary storage region such as a main memory and a work area of the CPU 202. An operating system, programs such as system software and application software, and data are also stored in the RAM 203.

The CPU 202 controls each component of the image forming apparatus 102 by loading a program stored in the ROM 204 onto the RAM 203, and executing the program. Programs based on which the CPU 202 operates are not limited to programs stored in the ROM 204, and programs prestored in a hard disk drive (HDD) 205 may be used.

The HDD 205 stores an operating system, system software, application software, image data, and setting data.

Nevertheless, another storage device such as a solid state drive (SSD), a secure digital (SD) memory card, or an embedded Multi Media Card (eMMC) may be used as long as the storage device can store data.

A display/operation unit interface (I/F) 206 is an interface unit with a display/operation unit 207, and outputs information to be displayed on the display/operation unit 207 to the display/operation unit 207. The display/operation unit I/F 206 also receives information input by the user, from the display/operation unit 207. The display/operation unit 207 includes a touch panel and hardware keys for receiving user operations. The touch panel is a planarly-formed panel, and notifies the display/operation unit I/F 206 of coordinate information indicating a coordinate of a position at which the user touches on the touch panel. The hardware keys are keys that can be physically pressed, such as number keys, a start key, and a stop key. In a case where a key is pressed, the key notifies the display/operation unit I/F 206 of the pressing operation performed on the key. The display/operation unit 207 also includes a display for displaying an image. The display receives a graphical user interface (GUI) screen generated by the CPU 202, from the display/operation unit I/F 206, and displays the GUI screen. By integrally installing the touch panel on the upper layer of the display, control can be performed as if the user directly operates a screen displayed on the display.

A network I/F 208 connects to the network (LAN) 105, communicates with the PC 101 or another image forming apparatus (not illustrated) that is connected on the same LAN, and inputs and outputs information to and from the mobile terminal 103 via the access point 104.

A device I/F 209 connects the controller unit 201 with a scanner 210 and a printer 211 each serving as an image input/output device, and inputs and outputs image data to and from the scanner 210 and the printer 211. More specifically, the device I/F 209 prints image data onto a sheet, and scans a document.

Figure 3:
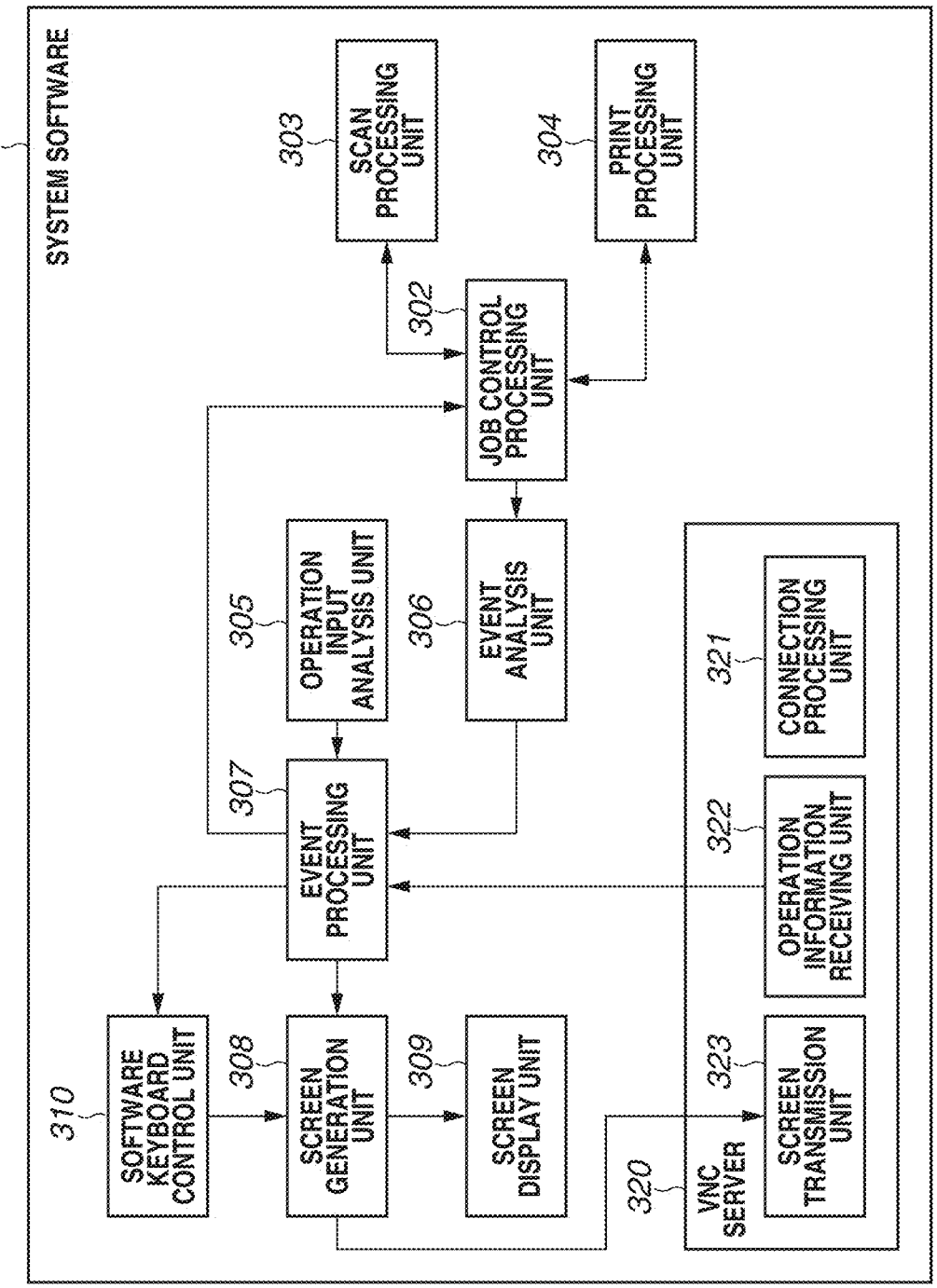
FIG. 3 is a diagram illustrating a software configuration of the image forming apparatus.

FIG. 3 is a diagram illustrating a software configuration of the image forming apparatus 102. System software 301 is stored in one of the storage units, i.e., the RAM 203, the ROM 204, and the HDD 205, and is executed by the CPU 202.

A job control processing unit 302 controls each of software modules including a software module (not illustrated), and controls jobs to be executed by the image forming apparatus 102, such as a copy job, a print job, and a scan job.

A scan processing unit 303 controls the scanner 210 via the device IF 209 based on an instruction of the job control processing unit 302, and performs processing of reading a document placed on a platen of the scanner 210.

A print processing unit 304 controls the printer 211 via the device L/F 209 based on an instruction of the job control processing unit 302, and performs processing of printing a designated image.

An operation input analysis unit 305 analyzes information supplied from the display/operation unit 207 via the display/operation unit I/F 206, and notifies an event processing unit 307 of an event corresponding to a user operation. Information to be analyzed by the operation input analysis unit 305 is operation information indicating that the user has touched the touch panel, or indicating that the user has pressed a hardware key.

An event analysis unit 306 receives various phenomena that occur in the image forming apparatus 102 aside from an operation input, from the job control processing unit 302, analyzes the incidents, and notifies the event processing unit 307 of events corresponding to the phenomena. Various phenomena to be analyzed by the event analysis unit 306 are phenomena other than phenomena that occur according to a user operation, such as a phenomenon that a job has been completed and a phenomenon that there is no sufficient supply of print sheets.

The event processing unit 307 receives an event from the operation input analysis unit 305, the event analysis unit 306, or an operation information receiving unit 322. The event processing unit 307 notifies the job control processing unit 302, a screen generation unit 308, or a software keyboard control unit 310 of the event, depending on the event, and controls each component of the image forming apparatus 102.

The screen generation unit 308 performs processing of generating, on the RAM 203, data on a screen to be displayed on the display/operation unit 207 or a display unit of an external apparatus.

A screen display unit 309 performs display control of reading the data on the screen that has been generated by the screen generation unit 308, from the RAM 203, and displaying the read data on the display of the display/operation unit 207 via the display/operation unit/F 206.

The software keyboard control unit 310 performs control of displaying a software keyboard screen, upon receiving a notification from the event processing unit 307. The software keyboard control unit 310 also holds information indicating whether a software keyboard is displayed on the display.

A VNC server 320 is a software module for communicating with a client via the LAN 105. For example, the VNC server 320 performs processing for communicating with a VNC client 520 operating on the mobile terminal 103, and receiving a remote operation.

A connection processing unit 321, for example, receives a connection request from a connection processing unit 521 of the VNC client 520 and performs connection control.

The operation information receiving unit 322, for example, receives operation information from an operation information transmission unit 522 of the VNC client 520 and notifies the event processing unit 307 of an event corresponding to a user operation. The event to be notified by the operation information receiving unit 322 is equivalent to the event to be notified by the operation input analysis unit 305, and is an event for the user operating the image forming apparatus 102.

A screen transmission unit 323 performs processing of reading screen data generated by the screen generation unit 308 from the RAM 203 and transmitting the screen data to a screen receiving unit 523 of the VNC client 520.

Figure 4:
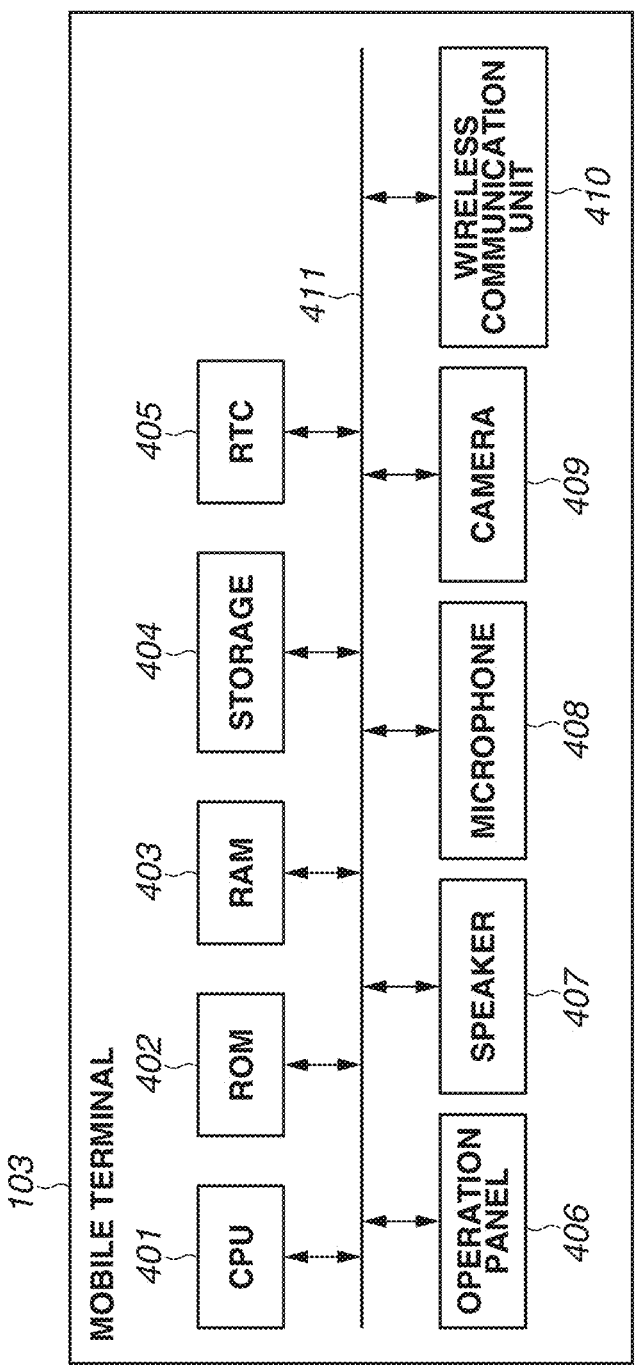
FIG. 4 is a diagram illustrating a hardware configuration of a mobile terminal.

FIG. 4 is a diagram illustrating a hardware configuration of the mobile terminal 103. In the mobile terminal 103, a CPU 401 is an arithmetic device that controls the entire system. The CPU 401 comprehensively controls devices connected to a system bus 411.

A ROM 402 is a nonvolatile memory, and stores image data and other types of data, and various programs based on which the CPU 401 operates.

A RAM 403 is a volatile memory, and is used as a temporary storage region such as a main memory and a work area of the CPU 401. An operating system, programs such as system software and application software, and data are also stored in the RAM 403.

The CPU 401 controls each component of the mobile terminal 103 by loading a program stored in the ROM 402 onto the RAM 403 and executing the program. Programs for operating the CPU 401 are not limited to programs stored in the ROM 402, and programs prestored in a storage 404 may be used.

The storage 404 stores an operating system, system software, application software, photographs, electronic documents, and setting data. Nevertheless, another storage device such as an SSD, an SD memory card, or an eMMC may be used as long as the storage device can store data.

A real time clock (RTC) 405 measures a time.

An operation panel 406 includes a touch panel function that can detect a touch operation of the user, and displays various screens provided by an operating system (OS) 530 and a multifunction peripheral (MFP) application 502. By inputting a touch operation to the operation panel 406, the user can input a desired operation instruction to the mobile terminal 103.

A speaker 407 and a microphone 408 are used when the user makes a call to another mobile terminal or a land-line phone, for example.

A camera 409 performs image capturing in response to an imaging instruction issued by the user. A photograph captured by the camera 409 is stored in a predetermined region of the storage 404.

A wireless communication unit 410 executes wireless communication such as a wireless communication LAN.

Figure 5:
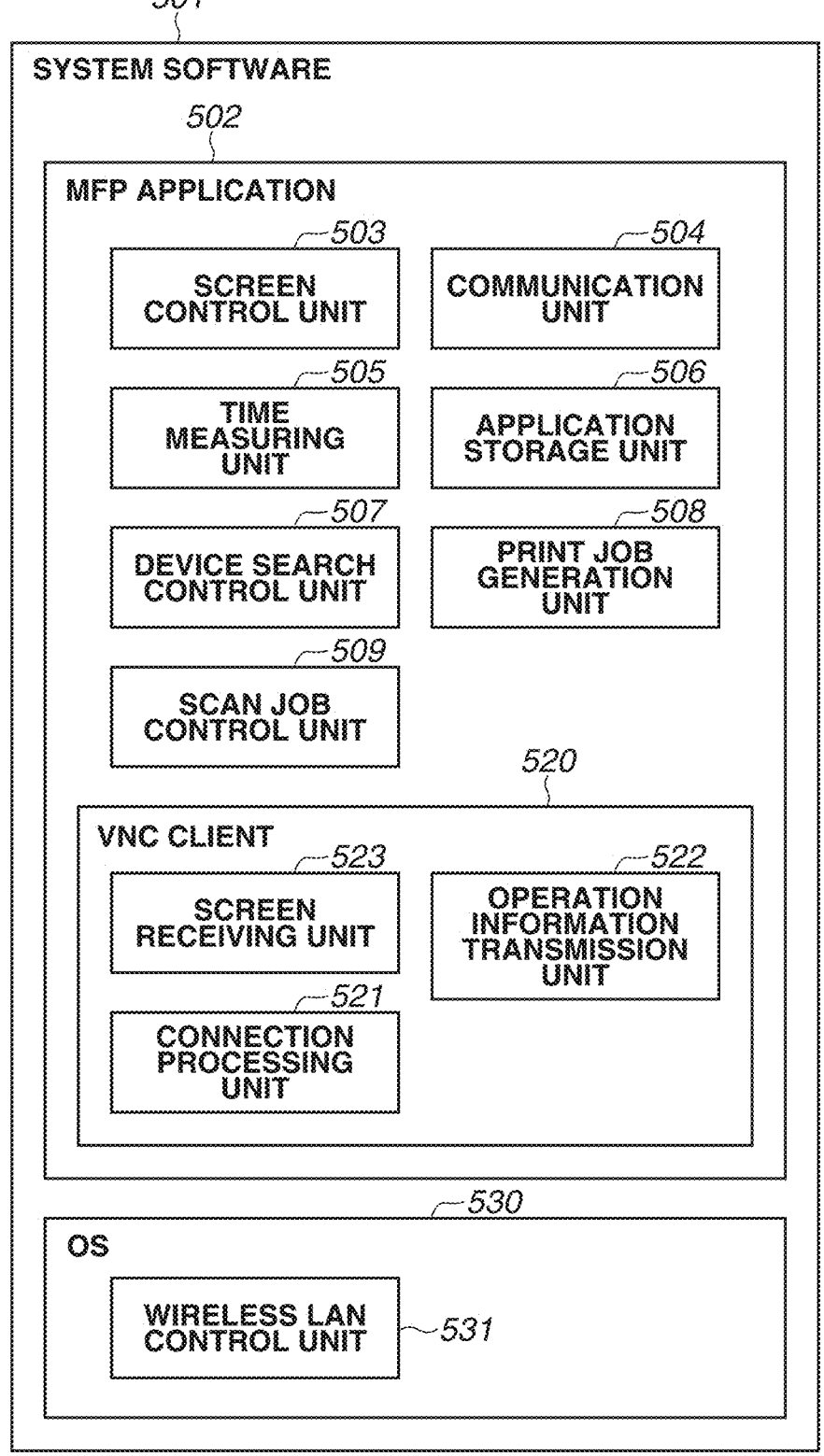
FIG. 5 is a diagram illustrating a software configuration of the mobile terminal.

FIG. 5 is a diagram illustrating a software configuration of the mobile terminal 103. System software 501 is stored in one of the storage units, i.e., the RAM 403, the ROM 402, and the storage 404, and is executed by the CPU 401.

The OS 530 is software for controlling operations of the entire mobile terminal 103.

Various applications including the MFP application 502 to be described below can be installed on the mobile terminal 103. The OS 530 exchanges information with these applications, and changes a screen to be displayed on the operation panel 406 in accordance with an instruction received from an application. The OS 530 also includes a device driver group for controlling various hardware components, and provides an application programming interface (API) for using various hardware components, to applications operating on the OS 530. In the present embodiment, the device driver group includes a wireless LAN control unit 531.

The wireless LAN control unit 531 is a device driver for controlling the wireless communication unit 410.

The MFP application 502 is an application installed on the mobile terminal 103. Using the MFP application 502, the mobile terminal 103 can provide a print or scan instruction to an image forming apparatus such as the image forming apparatus 102, and can perform a remote operation of an operation screen of an image forming apparatus. Aside from the MFP application 502, various applications may be installed on the mobile terminal 103, but the description thereof will be omitted.

A software configuration of the MFP application 502 will be described in more detail.

A screen control unit 503 controls a screen to be displayed on the operation panel 406 via the OS 530. An MFP application screen is displayed by the screen control unit 503 on the operation panel 406. The screen control unit 503 also determines an operation instruction input by the user via the operation panel 406. The screen control unit 503 also reads image data recorded on an application storage unit 506 by the screen receiving unit 523, and displays the read image data on the operation panel 406 via the OS 530.

A communication unit 504 controls wireless communication executed by the wireless communication unit 410, via the OS 530, and performs transmission and reception of commands.

A time measuring unit 505 measures a time.

The application storage unit 506 temporarily stores various types of information for executing the MFP application 502, in the RAM 403.

A device search control unit 507 generates search data for searching for the image forming apparatus 102 to be connected, transmits the search data to a device on the LAN 105 via the wireless communication unit 410, and receives a response from the image forming apparatus 102. While the search data is broadcasted to all devices on the LAN 105 in some cases, the search data is transmitted to one designated address in other cases.

A print job generation unit 508 generates a print job. A print job generated by the print job generation unit 508 is transmitted to the image forming apparatus 102 via the wireless communication unit 410. Then, printing is executed by the image forming apparatus 102.

A scan job control unit 509 issues a scan instruction to the image forming apparatus 102 via the wireless communication unit 410, and displays scan data received from the image forming apparatus 102. In a case where the scan data is to be stored, the scan data is stored in the application storage unit 506.

The VNC client 520 is a software module for remotely operating the image forming apparatus 102 by communicating with the VNC server 320 operating on the image forming apparatus 102, via the LAN 105.

The connection processing unit 521 transmits a connection request to the connection processing unit 321 of the VNC server 320 in response to a request from the user, and performs connection processing.

The operation information transmission unit 522 receives an operation instruction input by the user via the operation panel 406 from the screen control unit 503, and transmits the operation instruction to the operation information receiving unit 322 of the VNC server 320.

The screen receiving unit 523 receives screen data from the screen transmission unit 323 of the VNC server 320, and records the screen data onto the application storage unit 506.

Communication between the VNC server 320 and the VNC client 520 is executed by the CPU 202 and the CPU 401 respectively controlling the network I/F 208 and the wireless communication unit 410.

By the above-described processing of each software module, the same screen as a screen displayed on the display of the display/operation unit 207 of the image forming apparatus 102 is also displayed on the operation panel 406 of the mobile terminal 103. Then, by performing an operation using the operation panel 406 of the mobile terminal 103, the user can remotely cause the image forming apparatus 102 to execute various types of processing.

The details of handshake processing to be executed based on an RFB protocol will be described.

The handshake processing is executed by the connection processing unit 321 of the image forming apparatus 102 and the connection processing unit 521 of the mobile terminal 103. Communication processing between the connection processing units 321 and 521 is implemented by the CPU 202 and the CPU 401 respectively controlling the network I/F 208 and the wireless communication unit 410.

First of all, processing performed by the image forming apparatus 102 serving as a VNC server will be described.

FIG. 6 is a flowchart illustrating connection processing performed by the image forming apparatus 102. The connection processing is implemented by the CPU 202 reading a program for implementing each control module that is stored in the ROM 204 or the HDD 205, onto the RAM 203, and executing the program.

If the power of the image forming apparatus 102 is turned on by the user, a VNC server is activated by a system in the image forming apparatus 102. In the activation processing for activating the VNC server, in step S601, the connection processing unit 321 opens a port for a VNC connection, and waits for a connection from a client.

By the user operating the mobile terminal 103, a remote operation function is started, and the mobile terminal 103 transmits a request for a VNC connection with the image forming apparatus 102. In step S602, the connection processing unit 321 determines whether a connection request has been received from a client. In a case where the request has been received (YES in step S602), the processing proceeds to step S603. In a case where the request has not been received (NO in step S602), the processing in step S602 is repeated. If the connection request has been received from the client (YES in step S602), in step S603, the connection processing unit 321 transmits protocol version information to the client. A protocol version to be transmitted by the server is a version number of an RFB protocol supported by the server. For example, in a case where the server supports an RFB protocol 3.3, the server transmits "RFB 003.003\n".

After transmitting a protocol version to the client, in step S604, the connection processing unit 321 determines whether protocol version information has been received from the client. In a case where a protocol version has been received (YES in step S604), the processing proceeds to step S605. In a case where a protocol version has not been received (NO in step S604), the processing in step S604 is repeated. A protocol version to be received from the client in this step is a version number of an RFB protocol that is to be actually used in communication between the server and the client. For example, in a case where the RFB protocol 3.3 is to be used, "RFB 003.003\n" is received.

If the connection processing unit 321 receives the protocol version information from the client (YES in step S604), then in step S605, the connection processing unit 321 analyzes the received protocol version information.

The image forming apparatus 102 operates while interpreting a part of the protocol version information received from the client as information for designating a VNC connection priority order. Specifically, the image forming apparatus 102 interprets the first byte of a minor version of the protocol version received from the client, as information for designating a VNC connection priority order. In the present embodiment, in a case where the first byte indicates 0, the later priority is set, and in a case where the first byte indicates 1, the earlier priority is set. More specifically, in a case where the protocol version received from the client is "RFB 003.003\n", the later priority is set, and in a case where the protocol version is "RFB 003.103\n", the earlier priority is set. In the present embodiment, the description has been given of an example of switching a connection priority order depending on 0 or 1 indicated by the first byte of the minor version, but the switching configuration is not limited to this. For example, a plurality of functions may be switched using the first byte of the minor version. Specifically, a value that can be indicated by the first byte of the minor version is set to a value from 0 to F, and this is regarded as a numerical value of the hex number system. The numerical value of the hex number system corresponds to 4 bits in the binary number system. A function is allocated to each of the bits. For example, when the lowermost bit is allocated to a connection priority order, the remaining second, third, and fourth bits may be allocated to different functions. Then, by taking the logical sum of the bits, four functions can be simultaneously designated. For example, in a case where the later priority is to be designated as a connection priority order in this method, a minor version part can include "003", "203", "403", "603", "803", "A03", "C03", or "E03". In a case where the earlier priority is to be designated as a connection priority order in this method, a minor version part can include "103", "303", "503", "703", "903", "B03", "D03", or "F03". In addition, a byte to be used is not limited to the first byte of the minor version, and for example, the second byte from the head of the minor version may be used. In the present embodiment, a protocol version received from a client is used, but another client message of an RFB protocol may be used. For example, an initialization message of a client, ClientCutText, a new message of the RFB protocol extended for the future, or other unique messages undefined by the RFB protocol may be used. A specific numerical value may be designated in the case of the later priority, and nothing may be designated, i.e., it is left blank, in the case of the earlier priority.

In step S606, the connection processing unit 321 determines whether a VNC connection priority order is set to the earlier priority, based on a result of the analysis in step S605. In a case where the VNC connection priority order is set to the earlier priority (YES in step S606), the processing proceeds to step S607. In step S607, the connection processing unit 321 determines whether a client connected earlier using the VNC exists. In this example, the connection processing unit 321 determines that an earlier connected client exists in a case where a VNC connection has already been received earlier from another client, handshake processing has ended, and the image forming apparatus 102 and the client are ready to transmit and receive information such as a display screen.

In a case where it is determined in step S607 that an earlier connected client does not exist (NO in step S607), the handshake processing is ended, and then the processing proceeds to step S610. In step S610, a VNC connection is established with the client from which the connection request has been received in step S602. On the other hand, in a case where it is determined in step S607 that an earlier connected client exists (YES in step S607), the processing proceeds to step S608. In step S608, the connection processing unit 321 transmits error information indicating that a VNC connection has been established earlier, to the client. In the error information, a security type transmitted by the server may be extended, and, for example, "3" may be transmitted as a security type. After that, in step S609, the connection processing unit 321 cuts off the connection corresponding to the connection request received in step S602. More specifically, the connection processing unit 321 maintains the connection with the client connected earlier using the VNC, without establishing a VNC connection with a client connected later using the VNC.

In a case where it is determined in step S606 that the VNC connection priority order is not set to the earlier priority, i.e., the VNC connection priority order is set to the later priority, (NO in step S606), the processing proceeds to step S611. In step S611, the connection processing unit 321 determines whether a client connected earlier using the VNC exists. Because the determination is similar to the determination in step S607, the description thereof will be omitted. In a case where it is determined in step S611 that an earlier connected client does not exist (NO in step S611), the handshake processing is ended, and then the processing proceeds to step S610. In step S610, a VNC connection is established with the client from which the connection request has been received in step S602.

In a case where it is determined in step S611 that a client connected earlier using the VNC exists (YES in step S611), the processing proceeds to step S612. In step S612, the connection processing unit 321 cuts off the connection with the client connected earlier using the VNC.

The handshake processing is ended, and then in step S610, a VNC connection is established with the client from which the connection request has been received in step S602 (i.e., client connected later using the VNC). When the connection with the client connected earlier using the VNC is cut off, error information may be transmitted to the client connected earlier using the VNC. Then, the client that has received the error information displays information indicating an error.

In a case where a password is set for establishing a VNC connection, processing of receiving information that is based on a password input by the user, from the client, and checking the password is to be executed in step S610. Nevertheless, because the processing is known processing that is based on an RFB protocol, the description thereof will be omitted. After the connection is established in step S610, based on the RFB protocol, an initialization message is received from the client, and an initialization message is transmitted from the server. The exchange of the initialization message may be executed before the connection is cut off in step S612. After step S610, based on the RFB protocol, it becomes possible to transmit and receive information such as a display screen between the server and the client. Specifically, screen information transmitted by the screen transmission unit 323 is received by the screen receiving unit 523 of the VNC client 520. The same screen as a screen displayed on the display of the image forming apparatus 102 can be accordingly displayed on the display of the mobile terminal 103. In addition, information transmitted by the operation information transmission unit 522 of the VNC client 520 is received by the operation information receiving unit 322. The image forming apparatus 102 can be accordingly operated based on an operation received on the mobile terminal 103.

The example in which the client designates the earlier priority or the later priority has been described above, but the image forming apparatus 102 may be configured to identify the type of a client and determine the earlier priority or the later priority. In this case, in the VNC connection processing, the image forming apparatus 102 receives an identifier of the client from the client, and the image forming apparatus 102 determines whether to set the earlier priority or the later priority based on the identifier.

By the above-described processing in the flowchart, in a case where the number of clients that can be connected using the VNC and exchange screen information is limited to one, it can be determined whether the VNC connection priority order to the earlier priority or the later priority depending on a client that transmits a connection request.

In the case of the later priority, in a case where the user of the client connected earlier using the VNC forgets to cut off the VNC connection even if a remote operation ends, another user can establish a VNC connection later and perform a remote operation. The later priority having such an advantage is desirably provided in a case where a PC expected to perform a remote operation of the image forming apparatus 102 from a distant place serves as a client. This is because the user exists far in distance from the image forming apparatus 102, and the user is highly likely to fail to notice that the user has forgotten to cut off the VNC connection. Thus, the PC desirably designates the later priority in the VNC connection processing.

On the other hand, in the case of the earlier priority, once a VNC connection is established earlier, the connection is not deprived even if another user tries to establish a VNC connection later, which is an advantage of the earlier priority. The earlier priority having such an advantage is desirably provided in a case where a mobile terminal expected to perform a remote operation in front of the image forming apparatus 102 serves as a client. A user who desires to avoid touching a display of an image forming apparatus shared among a plurality of users is expected to establish a VNC connection from the user's mobile terminal to the image forming apparatus and cause the image forming apparatus to perform processing by operating the mobile terminal in front of the image forming apparatus. Thus, the client (mobile terminal) expected to establish the VNC connection in front of the image forming apparatus desirably designates the earlier priority. For this reason, the mobile terminal desirably designates the earlier priority in the VNC connection processing.

In this manner, the earlier priority and the later priority have their respective advantages. The above-described processing brings about such an effect that switching between the earlier priority and the later priority can be performed depending on a client in such a manner that the advantages can be obtained to the maximum extent possible.

Next, processing to be performed when the mobile terminal 103 serving as a VNC client establishes a VNC connection will be described.

FIGS. 8A and 8B illustrate examples of screens to be displayed on the operation panel 406 of the mobile terminal 103. If the mobile terminal 103 is activated, the mobile terminal 103 displays a home screen 810. An MFP application icon 811 is an icon for executing the MFP application 502.

FIG. 7 is a flowchart illustrating connection processing performed in a client, which is executed by the CPU 401 of the mobile terminal 103.

If the OS 530 detects that the user has tapped the MFP application icon 811 on the home screen 810, then in step S701, the OS 530 activates the MFP application 502. If the MFP application 502 is activated, the screen control unit 503 displays an application home screen (device unselected) 820 on the operation panel 406. A selected device icon 821 displays a currently-selected device. In a case where no device is selected, "No Printer" is displayed. A device search button 823 is a button for searching for an image processing apparatus. A remote operation menu 822 includes menu buttons for using remote operation functions.

If the screen control unit 503 detects that the device search button 823 has been tapped on the application home screen (device unselected) 820, then in step S702, the device search control unit 507 executes device search. In addition, the screen control unit 503 displays a device search screen 830 on the operation panel 406. On the device search screen 830, a list of devices found in the search is displayed. A search result 831 indicates the image forming apparatus 102. By selecting the search result 831, the image forming apparatus 102 can be selected as a target device. In step S703, the screen control unit 503 determines whether a device has been selected on the device search screen 830. In a case where it is determined in step S703 that a device has not been selected (NO in step S703), the screen control unit 503 repeats the processing in step S703. In a case where it is determined in step S703 that a device has been selected, e.g., it is detected that the search result 831 has been tapped by the user (YES in step S703), the screen control unit 503 displays an application home screen (device selected) 840 on the operation panel 406. As the selected device icon 821, a device selected on the device search screen 830 is displayed. A device displayed as the selected device icon 821 is a transmission destination device to which the MFP application 502 transmits a print job or a scan job. In addition, the device is to be remotely operated using the remote operation function.

In step S704, the screen control unit 503 determines whether the remote operation menu 822 has been selected on the application home screen (device selected) 840. In a case where it is determined in step S704 that the remote operation menu 822 has not been selected (NO in step S704), the screen control unit 503 repeats the processing in step S704. In a case where it is determined in step S704 that the remote operation menu 822 has been selected (YES in step S704), the MFP application 502 starts the remote operation function. If the remote operation function is started, the screen control unit 503 displays a device connecting screen 850 on the operation panel 406. A hardware key display button 851 is a button for displaying a hardware key screen for operating hardware keys of the image forming apparatus 102 from the mobile terminal 103.

If the remote operation function is started, then in step S705, the connection processing unit 521 transmits a connection request to a server (the image forming apparatus 102 in this example). After transmitting the connection request, in step S706, the connection processing unit 521 determines whether a protocol version has been received from the server. For example, in a case where the server supports the RFB protocol 3.3, "RFB 003.003\n" is received. In a case where the protocol version has been received from the server (YES in step S706), the processing proceeds to step S707. After receiving the protocol version from the server, in step S707, the connection processing unit 521 transmits the protocol version. In a case where the protocol version has not been received from the server (NO in step S706), the connection processing unit 521 repeats the processing in step S706. As described above, a protocol version to be transmitted by a client is a version number of an RFB protocol to be actually used in communication between the server and the client.

For example, in a case where the RFB protocol 3.3 is to be used, the connection processing unit 521 transmits "RFB 003.003\n". A part of protocol version information to be transmitted by a client can be interpreted as information for designating a VNC connection priority order. In this example, if the client is a mobile terminal, for example, an application designates the earlier priority, and if the client is a PC, the later priority is designated.

Aside from this example, a priority order to be designated may be switched between the earlier priority and the later priority depending on an OS operating on the client, or an application for establishing a VNC connection. For example, the MFP application 502 may designate the earlier priority and another VNC application may designate the later priority. Alternatively, the MFP application 502 may designate the earlier priority or the later priority by identifying the type of a terminal or the type of an OS on which the MFP application 502 operates. In this manner, a priority order to be designated is switched between the earlier priority and the later priority depending on the client.

As described above, a function may be switched between a plurality of functions by using the first byte of a minor version as a method of designating a connection priority order. Alternatively, the second byte from the head of the minor version may be used. Alternatively, another client message of the RFB protocol may be used.

After transmitting the protocol version, in step S708, the connection processing unit 521 determines whether error information has been received from the server. The determination is made based on a security type received from the server. For example, in a case where "3" obtained by extending the specifications has been received as a security type, the connection processing unit 521 determines that an error indicating that a client connected earlier using the VNC exists has been received.

In a case where it is determined in step S708 that error information has not been received (NO in step S708), the connection processing unit 521 ends the handshake processing performed based on the connection request transmitted in step S705, and a VNC connection is established. In a case where it is determined in step S708 that error information has been received (YES in step S708), the processing proceeds to step S709. In step S709, the connection processing unit 521 cuts off the connection corresponding to the connection request transmitted in step S705, and the screen control unit 503 displays an error screen 860 on the operation panel 406. An OK button 861 is a button for closing the error screen 860. If the OK button 861 is pressed, the screen control unit 503 closes the error screen 860 on the operation panel 406, and displays the application home screen (device selected) 840.

In a case where it is determined in step S708 that error information has not been received (NO in step S708), the handshake processing performed based on the connection request transmitted in step S705 ends with success. After that, based on the RFB protocol, an initialization message is transmitted from the client, and the initialization message is received from the server. Furthermore, after that, information such as a display screen is transmitted and received therebetween based on the RFB protocol. For example, in a case where a keyboard login screen is displayed on the display of the display/operation unit 207 of the image forming apparatus 102, a keyboard login screen 870 that is the same as the keyboard login screen can be displayed on the operation panel 406 of the mobile terminal 103. If a login button 871 is pressed after a user name and a password are entered, the entered information is transmitted to the server, and the user can remotely operate the image forming apparatus 102 in a similar manner to operating the display/operation unit 207 of the image forming apparatus 102. After logging in, the user can remotely issue an instruction to execute a print function or a scan function of the image forming apparatus 102.

By the above-described processing in the flowchart, the mobile terminal can designate a connection based on the earlier priority or a connection based on the later priority in establishing a VNC connection. Then, if a client connected earlier using the VNC exists in a case where the earlier priority is designated, an error screen is displayed.

In the present embodiment, the number of clients to be connected to the server using the VNC is one, and if a second client tries to establish a VNC connection later in a state in which a first client is connected earlier using the VNC, the connection with the first client or the second client is cut off. Nevertheless, VNC connection needs not be always cut off. It is sufficient that the number of clients to be remotely operated is limited to one. More specifically, VNC connections are established with both the first client and the second client, and transmission and reception of screen information are performed only with the first client or the second client.

A second embodiment will be described. In the first embodiment, in a case in which a client A connected earlier using the VNC exists, and another client B transmits a VNC connection request later, it is determined whether to cut off the VNC connection with the client A depending on whether the client B designates the earlier priority or designates the later priority. In the second embodiment, the description will be given of an example in which it is determined whether to cut off the VNC connection with the client A depending on whether the client A designates the earlier priority or designates the later priority.

In other words, while a priority setting designated by a client connected later using the VNC is considered in the first embodiment, a priority setting designated by a client connected earlier using the VNC is considered in the present embodiment.

Because the basic configuration in the present embodiment is the same as that in the first embodiment, only a difference will be described.

Figure 9:
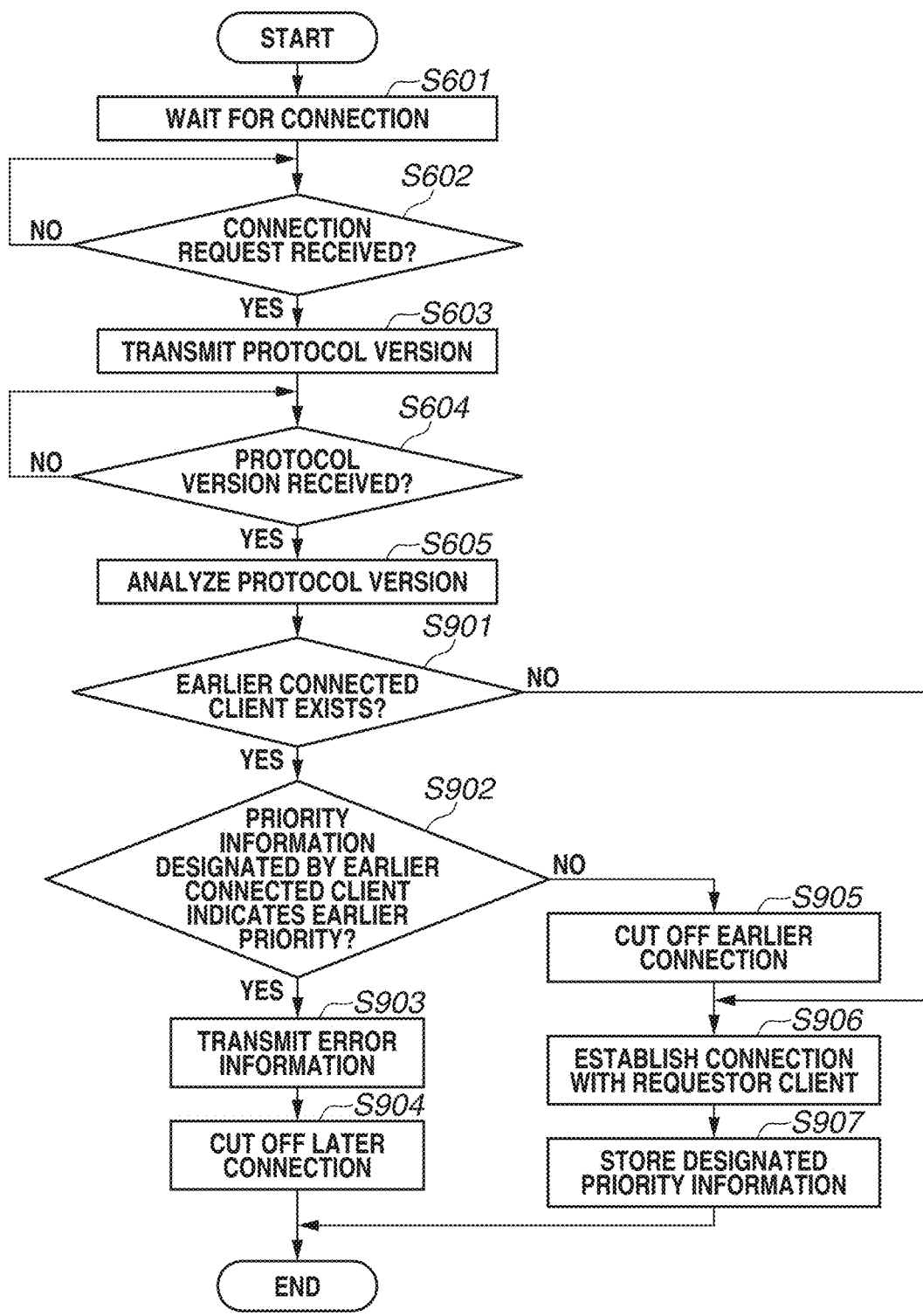
FIG. 9 is a flowchart illustrating connection processing performed by a VNC server according to a second embodiment.

FIG. 9 is a flowchart illustrating connection processing performed in a server, which is executed by the CPU 202 of the image forming apparatus 102. Because the basic configuration is the same as the flowchart in FIG. 6 in the first embodiment, only a difference will be described.

In step S901, the connection processing unit 321 determines whether a client connected earlier using the VNC exists. If it is determined that a client connected earlier using the VNC does not exist (NO in step S901), the processing proceeds to step S906. In step S906, the connection processing unit 321 establishes a VNC connection with the client from which the connection request has received in step S602. Then, in step S907, priority information designated by the client with which the VNC connection has been established is stored. The priority information is information indicating a VNC connection priority order that is designated by the client, and is information for designating the later priority or the earlier priority similarly to the first embodiment.

If it is determined in step S901 that a client connected earlier using the VNC exists (YES in step S901), the processing proceeds to step S902. In step S902, the connection processing unit 321 determines whether priority information designated by the client connected earlier using the VNC indicates the earlier priority. In a case where the priority information indicates the earlier priority (YES in step S902), the processing proceeds to step S903. In step S903, the connection processing unit 321 transmits error information to the client that has transmitted the connection request in step S602 (i.e., client connected later using the VNC). In step S904, the connection processing unit 321 cuts off the connection according to the connection request received in step S602.

If it is determined in step S902 that the priority information does not indicate the earlier priority, i.e., the priority information indicates the later priority (NO in step S902), the processing proceeds to step S905. In step S905, the connection processing unit 321 cuts off the VNC connection with the client connected earlier using the VNC. Then, in step S906, the connection processing unit 321 establishes a VNC connection with the client from which the connection request has received in step S602. In step S907, the priority information designated by the client is stored.

By performing the above-described processing in the flowchart, in accordance with priority information designated by a client connected earlier using the VNC, it is determined whether to establish a connection with a client to be connected later using the VNC.

Other Embodiments

In the above-described embodiments, the description has been given of an example in which a priority setting is switched between the earlier priority and the later priority depending on a VNC client. An example of switching between the earlier priority and the later priority is not limited to this. For example, the earlier priority or the later priority may be made pre-settable on a setting screen provided by the image forming apparatus 102, like a priority information setting screen 1000 illustrated in FIG. 10. If the user selects earlier priority 1001, the image forming apparatus 102 subsequently operates based on the earlier priority. If the user selects later priority 1002, the image forming apparatus 102 subsequently operates based on the later priority. A setting received on the setting screen may be set as a common setting of the image forming apparatus 102, or may be made settable for each user. In addition, when executing the VNC connection processing, the mobile terminal 103 may display a priority information designation screen 1010 on the display of the mobile terminal 103, and enable the user to designate the earlier priority or the later priority via the priority information designation screen 1010.

In the above-described embodiments, the description has been given of an example in which the same screen as a screen displayed on an image forming apparatus in a VNC connection is displayed on a mobile terminal, but a display configuration is not limited to this. For example, the above-described embodiments can also be applied to a case where a screen obtained by extending a screen of an image forming apparatus is displayed on a mobile terminal instead of displaying the same screen as the screen of the image forming apparatus.

Furthermore, an embodiment of the present invention can also be implemented by executing the following processing. More specifically, the processing is processing of supplying software (program) for implementing the functions of the above-described embodiments to a system or an apparatus via a network or various storage media, and a computer (or CPU, micro processing unit (MPU), etc.) of the system or the apparatus reading out the program and executing the program. In this case, the computer program and a storage medium storing the computer program are included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2021-094251, filed Jun. 4, 2021, which is hereby incorporated by reference herein in its entirety.

What is claimed is:
1. An information processing apparatus operating as a virtual network computing (VNC) server, the information processing apparatus comprising:
a memory; and
at least one processor in communication with the memory, wherein the at least one processor of the information processing apparatus is configured to perform:
in a case where a request for a VNC connection is received from a second VNC client in a state in which the information processing apparatus is connected with a first VNC client using VNC, first connection control to maintain the connection with the first VNC client and not to establish a VNC connection with the second VNC client, or second connection control to cut off the connection with the first VNC client and to establish the VNC connection with the second VNC client, receive version information of a remote frame buffer (RFB) protocol from a VNC client; and switch whether to perform the first connection control or the second connection control, based on the received version information.

2. The information processing apparatus according to claim 1, wherein the at least one processor is configured to perform the first connection control or the second connection control based on the version information that has been received from the second VNC client.

3. The information processing apparatus according to claim 2, wherein, in a case where the second VNC client is a personal computer (PC), version information of a RFB protocol indicating that the second connection control is to be executed is received.

4. The information processing apparatus according to claim 2, wherein, in a case where the second VNC client is a mobile terminal, version information of a RFB protocol indicating that the first connection control is to be executed is received.

5. The information processing apparatus according to claim 1, wherein the at least one processor is configured to perform the first connection control or the second connection control based on the version information that has been received from the first VNC client.

6. The information processing apparatus according to claim 5, wherein, in a case where the first VNC client is a mobile terminal, version information of a RFB protocol indicating that the first connection control is to be executed is received.

7. The information processing apparatus according to claim 1, wherein, in a case where the first connection control is performed not to establish the connection with the second VNC client, error information is transmitted to the second VNC client.

8. The information processing apparatus according to claim 1, wherein, in a case where the second connection control is performed to cut off the connection with the first VNC client, error information is transmitted to the first VNC client.

9. The information processing apparatus according to claim 1, wherein, in a case where the first VNC client is a PC, version information of a RFB protocol indicating that the second connection control is to be executed is received.

10. The information processing apparatus according to claim 1, wherein a state in which the information processing apparatus is connected using the VNC is a state in which screen information is transmittable.

11. The information processing apparatus according to claim 1, wherein the information processing apparatus is an information processing apparatus that establishes a VNC connection with one VNC client.

12. The information processing apparatus according to claim 1, wherein the information processing apparatus is an image forming apparatus including at least one of a print function and a scan function.

13. An information processing system including an information processing apparatus operating as a virtual network computing (VNC) server, and a terminal operating as a VNC client, wherein the terminal comprises:

a memory; and at least one processor in communication with the memory, wherein the at least one processor of the terminal is configured to transmit, to the information processing apparatus, version information of a remote frame buffer (RFB) protocol as information for designating whether to prioritize a connection with a VNC client connected earlier using VNC, or prioritize a connection with a VNC client connected later using VNC, when performing VNC connection processing with the information processing apparatus, wherein the information processing apparatus comprises:

a memory; and at least one processor in communication with the memory, and wherein the at least one processor of the information processing apparatus is configured to perform:

in a case where a request for a VNC connection is received from the terminal in a state in which a VNC client connected earlier using VNC exists, first connection control to maintain the connection with the VNC client connected earlier using VNC and not to establish a VNC connection with the terminal, or second connection control to cut off the connection with the VNC client connected earlier using VNC, and to establish a VNC connection with the terminal, receive the version information from the VNC client; and switch whether to perform the first connection control or the second connection control, based on the received version information.

14. The information processing system according to claim 13, wherein the transmitted version information is changed depending on a terminal.

15. A control method for an information processing apparatus operating as a virtual network computing (VNC) server, the control method comprising:

performing, in a case where a request for VNC connection has been received from a second VNC client in a state in which the information processing apparatus is connected with a first VNC client using VNC, first connection control to maintain a connection with the first client and not to establish a VNC connection with the second VNC client, or second connection control to cut off the connection with the first client and to establish a VNC connection with the second VNC client, receive version information of a remote frame buffer (RFB) protocol from a VNC client; and switch whether to perform the first connection control or the second connection control, based on the received version information.

* * * * *